United States Patent [19]

Shinohara et al.

[11] Patent Number: 5,516,456
[45] Date of Patent: May 14, 1996

[54] LIQUID CRYSTAL DISPLAY PANEL

[75] Inventors: Hironobu Shinohara, Machida; Toshihiro Ohtsuki, Yokkaichi, both of Japan

[73] Assignee: Japan Synthetic Rubber Co., Ltd., Tokyo, Japan

[21] Appl. No.: 393,490

[22] Filed: Feb. 24, 1995

[30] Foreign Application Priority Data

Feb. 24, 1994 [JP] Japan .................. 6-051315

[51] Int. Cl.$^6$ .................. C09K 19/52; G02F 1/1335
[52] U.S. Cl. .................. 252/299.01; 428/1; 359/12
[58] Field of Search .................. 252/299.01; 428/1; 359/62

[56] References Cited

U.S. PATENT DOCUMENTS

| | | | |
|---|---|---|---|
| 5,334,424 | 8/1994 | Hani et al. | 428/1 |
| 5,399,646 | 3/1995 | Kohara et al. | 326/282 |

FOREIGN PATENT DOCUMENTS

| | | |
|---|---|---|
| 0587890A1 | 3/1994 | European Pat. Off. . |
| 0591536A1 | 4/1994 | European Pat. Off. . |
| 5-61026 | 3/1993 | Japan . |
| 5-212828 | 8/1993 | Japan . |
| 6-51117 | 2/1994 | Japan . |
| 9302381 | 2/1993 | WIPO . |

*Primary Examiner*—Shean C. Wu
*Attorney, Agent, or Firm*—Oblon, Spivak, McClelland, Maier & Neustadt

[57] ABSTRACT

A liquid crystal display panel comprising structural elements such as transparent conductive films, polarizers, optical retardation films, color filters, light guide plates, light diffusing films, and converging films is disclosed. At least one of the structural elements comprises a layer made from a specific polymer having a saturated water absorption of 0.1–1% by weight at 23° C. and obtained by the ring-opening polymerization of a specific norbornene derivative with a polar group in the norbornene structure. The liquid crystal display panel is light and convenient to use, excellent in the distinctness of image and productivity, and exhibits no deterioration in image quality during the use in severe, high temperature and high humidity conditions for a long period of time.

19 Claims, No Drawings

LIQUID CRYSTAL DISPLAY PANEL

BACKGROUND OF THE INVENTION

1. Field of the Invention

The present invention relates to a liquid crystal display panel made up of structural elements having superior transparency and heat resistance, and exhibiting excellent adhesion to other materials.

2. Description of the Background Art

A liquid crystal display panel is conventionally made up of various structural elements, such as liquid crystals, liquid crystal alignment layers, transparent conductive films, polarizers, optical retardation films, color filters, light guide plates, light diffusing films, and converging films. Along with expanded application of liquid crystal display panels in recent years, including the application to equipment used in vehicles or outdoor, the liquid crystal display panels must be large, withstand severe conditions of use, and produce distinct display images. Because of this, lightness in weight, high productivity, excellent heat resistance and transparency, and superior durability under high temperature and high humidity conditions, without changes in the retardation and deterioration of the film, are demanded of the various structural elements of the liquid crystal display panels. An element which does not satisfy even one of these requirements causes problems, such as indistinct display images, low productivity, inferior compactness, and high cost.

For example, glass has conventionally been used for liquid crystal substrates and transparent substrates for color filters. Because glass is heavy and easily broken, the display panels made from glass are heavy and inconvenient to carry about if they are large, and special care must be taken in handling to avoid breakage of the glass. Furthermore, since it is difficult to roll glass, productivity is poor and glass is not adaptable to mass-production.

In an attempt to overcome these problems, a method of using transparent resins instead of glass for structural elements of liquid crystal display panels has been disclosed. Because films made from these transparent resins are light and flexible, the productivity is improved and the products are light and convenient to use. For this reason, transparent resins are currently widely used for almost all structural elements of liquid crystal display panels. Examples include transparent conductive films prepared by forming a transparent conductive membrane of metal oxide on the surface of films made from acrylic resin such as polymethyl methacrylate (PMMA), polycarbonate resin (PC), polyester resin such as polyethylene terephthalate (PET); polarizing element protective films for polarizers made from triacetyl cellulose (TAC); optical retardation films made from polyvinyl alcohol (PVA), TAC, or PC; light guide plates made from PMMA or the like; color filters, light diffusing films, and converging films made from PET, PC, or the like.

However, all the conventional transparent resins used for these structural elements have some drawbacks. It performance of the liquid crystal display panels are frequently affected by such drawbacks. For example, acrylic resins, PVA, and TAC have a low heat deflection temperature and a comparatively high water absorptivity. Uniformity of film retardation may be impaired by the heat to which the liquid crystal display panels are exposed during the fabrication or by the heat or water during use of the display panels. In the extreme case, the films are deformed. Films made from PET or PC has only poor retardation uniformity. When these are used for liquid crystal display panels, the display images are distorted. PET and PC also have a comparatively high specific gravity and are thus heavy, so that instruments with large panels using a color filter made from these resins are heavy and difficult to carry about. The advantage of high productivity and conveniences, such as compactness and lightness, expected by the use of transparent resins for structural elements of liquid crystal display panels is thus not necessarily realized. It is essential to specially treat each structural element in order to overcome these drawbacks.

Thermoplastic norbornene resins have been proposed as materials to overcome the various aforementioned problems associated with the drawbacks in the abovementioned conventional resins. EP 587890 and EP 591536 disclose a method of using a thermoplastic norbornene resin as optical retardation films, Japanese Patent Application Laid-open (kokai) No. 61026/1993 discloses a method of using a thermoplastic norbornene resin as liquid crystal substrates, and Japanese Patent Application Laid-open (kokai) No. 212828/1993 and No. 51117/1994 disclose a method of using a thermoplastic norbornene resin as polarizing element protective films for polarizers.

These patent applications mention that polycarbonate resins have high water absorptivity and, therefore, their retardation tends to change by absorbing water, and claim that norbornene resins having a water absorption of 0.05% or less can be easily obtained.

However, there are varieties of norbornene resins with different components and these do not always have a water absorption of 0.05% or less. The water absorption of 0.05% or less can be achieved only in norbornene resins made from polyolefins which consist of carbon and hydrogen or those containing some halogen. If a structural element of liquid crystal display panels using a substrate made from such a resin is attached or adhered to other elements, water may invade the interface between them due to insufficient adhesion, whereby the performances of the liquid crystal display panels are unduly impaired.

Although norbornene resins have excellent characteristics, such as transparency, retardation, and low hygroscopicity due to the norbornene structure, they are inferior in resistance to oxygen and heat due to the existence of ternary hydrogen contained in that structure. This is the cause of poor durability of these resins and addition of an antioxidant is essential to improve the durability. The antioxidant is used by blending it with the resin or by applying it to the surface of molded articles. Compatibility of the resin with antioxidants, however, decreases because of the requirement for limiting the norbornene resin components to carbon and hydrogen or to carbon, hydrogen, and halogen for reducing the water absorption. The addition of a large amount of the antioxidant impairs transparency of the resin or causes the antioxidant to bleed on the surface. It has been thus difficult to obtain a resin with sufficient durability.

In spite of the strong demand for high quality liquid crystal display panels made from structural elements, which are light in weight, having high productivity, heat resistance, and transparency, possessing superior durability with no changes in retardation or deterioration of films under high temperature and high humidity conditions, and exhibiting excellent adhesiveness to other materials, no liquid crystal display panels which satisfy these requirements have been known heretofore.

The present invention has been achieved in view of the above problems in the prior art, and has an object of providing a liquid crystal display panel which is made from structural elements, which satisfy all the requirements of lightness, superior heat resistance, transparency, and high productivity, have superior durability under high temperature and high humidity conditions, and exhibit excellent adhesiveness to other materials.

SUMMARY OF THE INVENTION

The above object is achieved according to the present invention by a liquid crystal display panel which comprises at least one structural element selected from transparent conductive films, polarizers, optical retardation films, color filters, light guide plates, light diffusing films, and converging films, wherein said at least one structural element comprises a layer made from:

(A) a hydrogenated product of polymer obtained by the ring-opening polymerization of a monomer which is a norbornene derivative represented by the following formula (I),

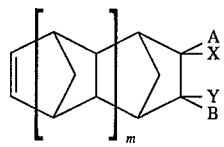 (I)

wherein A and B may be the same or different and each represents a hydrogen atom or a hydrocarbon group having 1 to 10 carbon atoms; X and Y may be the same or different and each represents a hydrogen atom or a monovalent organic group having 1 to 10 carbon atoms, provided that either X and Y is a group having a polar group other than hydrogen atom and hydrocarbon group; and m denotes 0 or 1 (this norbornene monomer is hereinafter referred to as "specific monomer"), (B) a hydrogenated product of polymer obtained by the ring-opening copolymerization of the specific monomer and a monomer other than the specific monomer but copolymerizable with the specific monomer, or (C) a mixture of two or more polymers selected from polymers (A) and (B) (polymers (A), (B), and (C) are hereinafter individually and collectively referred to as "specific polymer"), and wherein said specific polymer has a saturated water absorption of 0.1–1% by weight at 23° C.

Other objects, features and advantages of the invention will hereinafter become more readily apparent from the following description.

DETAILED DESCRIPTION OF THE INVENTION AND PREFERRED EMBODIMENTS

Among specific monomers, those having a specific polar group represented by the formula —$(CH_2)_n COOR$ are preferred, because such specific monomers can provide the hydrogenated products of ring-opening polymers with a high glass transition temperature and a low water absorption.

In the above formula for the specific polar group, R is a hydrocarbon group, preferably an alkyl group, having 1–12 carbon atoms, and n is typically 0–5. A smaller value of n is preferable for obtaining ring-opening polymers with a high glass transition temperature. The specific monomers wherein n is 0 are particularly preferred, because such monomers are easily synthesized and can produce ring-opening polymers with a high glass transition temperature.

Furthermore, it is desirable that A or B in formula (1) be an alkyl group, particularly a methyl group, and further that this alkyl group be bonded to the same carbon atom to which said specific polar group represented by the formula —$(CH_2)_n COOR$ is bonded.

In addition, the specific monomers of formula (1) wherein m is 0 are preferred because of their capability of producing ring-opening polymers with a high glass transition temperature.

The following compounds are given as specific monomers represented by said formula (1):

5-methoxycarbonylbicyclo[2.2.1]hept-2-ene, 5-methyl-5-methoxycarbonylbicyclo[2.2.1]hept-2-ene,
  5-cyanobicyclo[2.2.1]hept-2-ene, 8-methoxycarbonyltetracyclo[4. 4. 0. $1^{2,5}$. $1^{7,10}$]-3-dodecene, 8-ethoxycarbonyltetracyclo[4. 4. 0. $1^{2,5}$. $1^{7,10}$]-3-dodecene, 8-carboxy-n-propyltetracyclo[4. 4. 0. $1^{2,5}$. $1^{7,10}$]-3-dodecene, 8-carboxy-iso-propyltetracyclo[4. 4. 0. $1^{2,5}$. $1^{7,10}$]-3-dodecene, 8-carboxy-n-butyltetracyclo[4.4. 0. $1^{2,5}$. $1^{7,10}$]-3-dodecene, 8-methyl-8-methoxycarbonyltetracyclo[4. 4. 0. $1^{2,5}$. $1^{7,10}$]- 3-dodecene, 8-methyl-8-ethoxycarbonyltetracyclo[4. 4. 0. $1^{2,5}$. $1^{7,10}$]-3-dodecene.

8-methyl-8-carboxy-n-propyltetracyclo[4. 4. 0. $1^{2,5}$. $1^{7,10}$]-3-dodecene, 8-methyl-8-carboxy-iso-propyltetracyclo[4. 4. 0. $1^{2,5}$. $1^{7,10}$]-3-dodecene, and 8-methyl-8-carboxy-n-butyltetracyclo[4. 4. 0. $1^{2,5}$. $1^{7,10}$] -3-dodecene.

Among these, 8-methyl-8-methoxycarbonyltetracyclo[4. 4. 0. $1^{2,5}$. $1^{7,10}$]-3-dodecene is particularly preferred due to its capability of producing ring-opening polymers with a high glass transition temperature and a low water absorption.

These specific monomers are not necessarily used alone. Combined use of two or more of these for ring-opening copolymerization is possible.

<Copolymerizable Monomers>

The specific polymers in the present invention may be either a homopolymer obtained by the ring-opening polymerization of one of the above specific monomers or a copolymer obtained by the ring-opening polymerization of this specific monomer and a copolymerizable monomer.

As specific examples of the copolymerizable monomer, cycloolefins, such as cyclobutene, cyclopentene, cycloheptene, cyclooctene, bicyclo[2.2.1]hept-2-ene, tricyclo [5.2.1.0$^{2,6}$]-3-decene, 5-ethylidene-2-norbornene, and dicyclopentadiene, can be given. Furthermore, the specific monomers can be polymerized by ring-opening in the presence of polymers made from unsaturated hydrocarbons having carbon-carbon double bonds in the main chain, such as polybutadiene, polyisoprene, styrene-butadiene copolymer, ethylene-nonconjugated diene polymer, and norbornene polymer. Hydrogenated polymers obtained from these ring-opening copolymers are useful as raw materials for producing resins with a large impact resistance.

<Polymerization Catalysts>

The ring-opening polymerization reaction in the present invention can be carried out using a metathesis catalyst. The metathesis catalyst comprises a combination of (a) at least one compound selected from the compounds of W, Mo, and Re and (b) at least one carbon-element or hydrogen-element bonding, wherein the element is selected from the group consisting of Group IA elements (e.g. Li, Na, K), Group IIA elements (e.g. Mg, Ca), Group IIB elements (e.g. Zn, Cd, Hg), Group IIIA elements (B, Al), Group IVA elements (e.g. Si, Sn, Pb), or Group IVB elements (e.g. Ti, Zr) of the Deming's periodic table. The catalyst may further contain an additive (c), hereinafter described, for increasing the catalyst activity.

$WCl_6$, $MoCl_5$, $ReOCl_3$ and the like, described in Japanese Patent Laid-open (kokai) No. 240517/1989, are given as typical compounds of W, Mo, and Re which are suitably used as the component (a).

Given as specific examples of component (b) are compounds described in Japanese Patent Laid-open (kokai) No. 240517/1989, such as n-$C_4H_9Li$, $(C_2H_5)_3Al$, $(C_2H_5)_2AlCl$, $(C_2H_5)_{1.5}$, $(C_2H_5)AlCl_2$, methyl alumoxane, and LiH.

Alcohols, aldehydes, ketones, amines, and the like are typical examples of additives which are suitably used as component (c). Beside these, compounds described in Japanese Patent Laid-open (kokai) No. 240517/1989 may be used.

<Solvents Used for the Ring-opening Polymerization Reaction>

Given as examples of solvents used in the ring-opening polymerization reaction (solvents which constitute a solution of molecular weight adjusting agents or function as solvents for the specific monomers and/or the metathesis catalyst) are alkanes, such as pentane, hexane, heptane, octane, nonane, and decane; cycloalkanes, such as cyclohexane, cycloheptane, cyclooctane, decalin, and norbornane; aromatic hydrocarbons, such as benzene, toluene, xylene, ethylbenzene, and cumene; halogenated alkanes or aryl compounds, such as chlorobutane, bromohexane, methylene chloride, dichloroethane, hexamethylene dibromide, chlorobenzene, chloroform, and tetrachloroethylene; saturated carboxylic acid esters, such as ethyl acetate, n-butyl acetate, iso-butyl acetate, and methyl propionate; and ethers, such as dibutyl ether, tetrahydrofurane, and dimethoxyethane. These solvents can be used either alone or in combination of two or more. Of these, aromatic hydrocarbons are particularly preferred.

The amount of the solvent, in terms of the ratio by weight to the specific monomers used, is normally 1:1 to 10:1, and preferably 1:1 to 5:1.

The molecular weight of the cycloolefin polymers used in the present invention, in terms of the inherent viscosity, is preferably in the range of 0.2 to 5.0.

<Hydrogenation Catalyst>

The ring-opening polymers thus obtained are hydrogenated using a hydrogenation catalyst.

Solid catalysts comprising a noble metal catalytic material, such as palladium, platinum, nickel, rhodium, or ruthenium, carried on a carrier, such as carbon, silica, alumina, tatania, or the like, are given as examples of unhomogeneous system catalysts. Given as examples of homogeneous system catalysts are nickel naphthenate/triethylaluminum, nickel acetylacetonate/triethylaluminum, cobalt octenate/n-butyllithium, titanocene dichloride/diethylaluminum monochloride, rhodium acetate, chlorotris(triphenylphosphine)rhodium, dichlorotris(triphenylphosphine)ruthenium, chlorohydrocarbonyltris(triphenylphosphine)ruthenium, dichlorohydrocarbonyltris(triphenylphosphine)ruthenium, and the like. Catalysts may be either a powder or particles.

The degree of hydrogenation of the polymer is 90% or higher, and preferably 95% or higher, as measured by $^1$H-NMR at 60 MHz. The higher the degree of hydrogenation, the better the stability of the polymer against heat and light.

The specific polymer used in the present invention preferably has a gel content of 5% by weight or smaller, and more preferably 1% by weight or smaller, in this hydrogenated polymer.

It is desirable that the specific polymer thus obtained have a saturated water absorption in the range of 0.1 to 1% by weight at 23° C. If the saturated water absorption is less than 0.1% by weight, the product obtained from the resulting specific polymer exhibits only poor adhesion to other films such as liquid crystal substrates, polarizers, or optical retardation films. The films may be detached during use. In addition, a low saturated water absorption may reduce compatibility of the specific polymer with antioxidants. If a large amount of antioxidant is added, transparency is impaired and bleeding may occur on the surface. If the saturated water absorption is larger than 1% by weight, liquid crystal substrates and polarizers produced from the specific polymer has a poor moisture resistance. Fluctuation of retardation due to moisture absorption may increase, making it difficult to obtain optically homogeneous liquid crystal substrates and polarizers.

The saturated water absorption in the present invention is determined by measuring the weight increase of samples after immersing them for 1 week at 23° C. according to ASTM D570.

The specific polymer may have a saturated water absorption of smaller than 0.1% by weight and exhibit only poor adhesion and compatibility with antioxidants, if all the substituents in the norbornane structure of the thermoplastic norbornene resin are non-polar groups such as hydrogen atom or hydrocarbon groups.

On the other hand, if all of A, B, X, and Y in formula (I) are polar groups, the saturated water absorption of the specific polymer will be larger than 1% by weight. Therefore, it is desirable to select substituents of the thermoplastic norbornene resin such that the resulting specific polymer has a saturated water absorption in the range defined above.

Because these specific polymers are amorphous, it is possible to obtain films with no retardation. In addition, the specific polymers have a specific gravity of about 1.10, which is smaller than that of conventionally known films, such as PET (about 1.4) and PC (about 1.20). Accordingly, a comparatively light display panel can be prepared even if it is large.

A feature of the specific polymers of the present invention is in their possession of polar groups. This contributes to superior adhesiveness of the polymers to adhesives, glues, and other construction films.

In addition, because norbornene resins containing polar groups have a high glass transition temperature, they can produce films with excellent heat resistance. Films for structural elements of liquid crystal display panels made from such a resin do not bend or warp by heat during fabrication or use. For example, this resin provides an advantage of producing a thin transparent conductive film when such a film is prepared by forming a transparent conductive layer on the substrate made from this resin by spattering. This is because the higher the substrate temperature during spattering, the easier the metal film crystallizes, whereby the temperature dependency of the resistance can be reduced and the conductivity becomes high. A high substrate temperature is permitted due to the high heat resistance (150° C. or higher) of the transparent substrate prepared from the resin of the present invention.

Furthermore, due to the existence of highly reactive ternary hydrogen in the norbornane structure in the polymer chain thermoplastic norbornene resins have only poor resistance to oxygen and heat and thus poor durability. The addition of antioxidants which is incompatible with the resin is essential. In the case of the specific polymers of the present invention, which have high compatibility with antioxidants due to polar groups contained in the norbornane structure, the resin can produce a homogeneous mixture with a large amount of antioxidant, whereby its durability is remarkably improved. Inclusion of polar groups in the norbornane structure also improves mechanical strength, adhesiveness to other films, adhesives, or glues. The heat resistance is also greatly improved. Nevertheless, the norbornene resin containing polar groups in the norbornane structure exhibits a large moisture absorption which is in a reverse relationship to these characteristic. The moisture absorption, however, can be suppressed to a level which causes no problems by controlling the types and amounts of functional groups. A film with well balanced moisture resistance and adhesiveness can be obtained by controlling the water absorption in the above range.

Antioxidants known in the art can be added to the specific polymer used as the material for structural elements in the present invention. Examples of the antioxidant include phenolic antioxidants such as 2,6-di-tert-butyl- 4-methylphenol, 2,2'dioxy-3,3'-tert-butyl- 5,5'-dimethylphenylmethane, tetrakis[methylene-3-(3,5-di-tert-butyl- 4-hydroxyphenyl)propionate]methane, 1,1,3tris( 2-methyl-4-hydroxy-5-tert-butylphenyl)butane, 1,3,5-trimethyl- 2,4,6-tris(3,5-di-tert-butyl-4-hydroxybenzyl)benzene, stearyl-β-(3,5-di-tert-butyl-4-hydroxyphenyl)propionate, 2,2'-dioxy-3,3'-di-tert-butyl-5,5'diethylphenylmethane, and 3,9-bis[1,1-dimethyl-2-[β-(3-tert-butyl- 4-hydroxy-5-methylphenyl)propionyloxy]ethyl]- 2,4,8,10-tetraoxyspiro [5,5]undecane; a phosphite antioxidant such as tris(2,4-di-tert-butylphenyl)phosphite, cycloneopenetanetetraylbis(2,4-di-tertbutylphenyl)phosphite, cycloneopentanetetraylbis(2, 6-di-tert-butyl- 4-methylphenyl)phosphite, and 2,2-methylenebis( 4,6-di-tert-butylphenyl)octylphosphite; and a sulfide antioxidant such as dilauryl-3,3'-thiodipropionate and pentaerythrityltetrakis(3-laurylpropionate).

These antioxidants can be used either alone or in combinations of two or more. Combinations of a phenolic antioxidant and a phosphite antioxidant are particularly preferred.

The amount of these antioxidants to be added is 0.1–3, preferably 0.2–2, parts by weight for 100 parts by weight of the specific polymer. If the amount of antioxidant is too small, the durability is improved only insufficiently; if it is too large, the antioxidants may bleed on the surface of the molded articles and the transparency is decreased.

Beside the antioxidants, various additives may be optionally added to the specific polymer of the present invention. Such additives include UV absorber, such as p-tert-butylphenylsalicylate, 2,2-dihydroxy-4-methoxybenzophenone, 2,4-dihydroxybenzophenone, 2-hydroxy-4-methoxybenzophenone, and 2-(2'-dihydroxy-4'-m-octoxyphenyl)benzotriazole; stabilizers, antistatic agents, flame retardants, elastomers for improving the impact resistance, and the like. In addition, lubricants and the like may be added to improve the processability.

The specific polymer can be made into a film used in a structural element of the liquid crystal display panels by any known molding method, such as injection molding, extrusion, compression molding, or solvent cast molding.

Each structural element will now be illustrated.

<Transparent Conductive Film>

The thickness of the transparent conductive film made from the specific polymer is 5–500 μm. preferably 10–300 μm, and more preferably 25–200 μm. The thickness irregularity of the surface is ±50 μm or less, with an $R_{max}$ of 0.2 μm or less; preferably ±25 μm or less, with an $R_{max}$ of 0.1 μm or less; and particularly preferably ±20 μm or less, with an $R_{max}$ of 0.08 μm or less. When the irregularity is large or the surface is not smooth, a warp may be produced on the display panel.

The transparent conductive film which is one of the structural elements of the liquid crystal display panel of the present invention can e prepared by forming a transparent electrode layer on the surface of the substrate obtained above.

The transparent electrode layer consists of a transparent conductive layer which is produced by vacuum deposition, spattering, ion plating, molten metal injection, metal plating, chemical deposition, spraying, or the like. Spattering and vacuum deposition are particularly preferred among these methods.

As the material for forming the transparent conductive layer, metals such as Sn, In, Ti, Pb, Au, and Ag, or oxides of these metals are commonly used. When a metal is formed on the substrate, the metal can be oxidized after formation, if required. Although a metal oxide may be attached to form a layer, a method of first coating a metal or a low-oxidized metal and making it transparent by an oxidizing treatment such as heating, anodic oxidation, or liquid phase oxidation is acceptable.

In order to prevent deterioration due to permeation of oxygen or to increase the durability, it is desirable to laminate a gas barrier material, such as polyvinylidene chloride or polyvinyl alcohol, between the substrate and the transparent electrode layer or over the opposite side of the adhesion layer of the substrate and the transparent electrode.

A hard coating layer may be laminated over the gas barrier layer for the purpose of improving scratch resistance and heat resistance of the transparent conductive film. Organic hard coating materials, such as organic silicone resin, melamine resin, epoxy resin, and acryl resin, and inorganic hard coating materials such as silicon dioxide can be used as the hard coating materials. Of these, hard coat materials of organic silicone resin and melamine resin are preferred. Among various organic silicone resins with different functional groups, those having an epoxy group are preferred.

<Polarizer>

Films and sheets obtained by solvent casting or melt molding of the specific polymer can be used as the protective films for polarizing elements of polarizers in the present invention. The method of solvent casting disclosed in Japanese Patent Laid-open (kokai) No. 148413/1993 can be used for preparing such films and sheets. The extrusion molding, calendar molding, heat press molding, or injection molding, disclosed in Japanese Patent Laid-open (kokai) No. 59218/1992, can be used as the melt molding method. However, a preferred melt molding method is melt extrusion.

The thickness of the polarizing element protective films made from the specific polymer is 5–500 μm. preferably 10–300 μm, and more preferably 20–200 μm.

The polarizer can be obtained according to the present invention by laminating the protective films prepared by the above-described method on both sides of the polarizing element by the method described below.

An adhesive or a glue can be used for laminating a protective film of the specific polymer over the polarizing element of polarizers. Adhesives or glues with superior transparency are preferably used. Specific examples include curing-type glues, such as natural rubbers, synthetic rubbers, vinyl acetate-vinyl chloride copolymers, polyvinyl ether, acrylic resins, and modified polyolefin resins, and mixtures of these resins and a curing agent such as isocyanate; a dry laminate adhesive, such as a mixture of a polyurethane resin solution and a polyisocyanate resin solution; and epoxy resin adhesives.

There are no limitations to the polarizing elements used in the present invention, inasmuch as the same can function as a polarizing element. Examples are a PVA-iodine polarizer or a dye-containing polarizer wherein a bicolor dye adsorbed and oriented in a PVA film; a polyene-type polarizer, wherein a polyene is formed by inducing a dehydration reaction in a PVA film or a dehydrochloride reaction in a polyvinyl chloride film; and polarizer, such as a modified PVA film containing a cationic group in the molecule and a bicolor dye in the surface and/or inside thereof.

There are no limitations also to the method of manufacturing the polarizing elements. Known methods, such as a method of drawing a PVA film and absorbing iodine ion, a method of dying a PVA film with a bicolor dye and drawing the film, a method of drawing a PVA film and dying the film with a bicolor dye, a method of printing a PVA film with a bicolor dye and drawing the film, and a method of drawing a PVA film and printing the film with a bicolor dye, can be used. More specifically, there is a method comprising dissolving iodine in a potassium iodine solution to produce a high concentration iodine ion to absorb the iodine ion in a PVA film, drawing the PVA film, and immersing it in a 1–4 wt % boric acid solution at 30°–40° C. Another method comprises treating a PVA film with a boric acid solution in the same manner as above, drawing it in the uniaxial direction to extend the length to 3–7 times, and immersing it in a 0.05–5 wt % bicolor dye aqueous solution at 30°–40° C. to absorb the dye, followed by drying at 80°–100° C. to fix the dye with heat.

<Optical Retardation Film>

The optical retardation film which is one of the structural elements of the liquid crystal display panel in the present invention can be obtained by making a sheet from the specific polymer by melt molding or solvent casting and drawing the sheet to effect orientation. The T-die method or the inflation method can be applied as the method of solvent casting.

The thickness of the sheet before drawing is 25–500 μm. preferably 50–400 μm, and more preferably 100–300 μm.

Commonly known uniaxial drawing methods, such as lateral uniaxial drawing according to the Tenter method, compression drawing between rolls, longitudinal uniaxial drawing using rolls rolling at a different rotation speed, or the like can be used as the drawing method. It is possible to use a biaxial drawing, wherein the sheet is drawn in a direction the extent that molecular orientation is not affected and then further drawn in another direction for molecular orientation.

The films thus obtain contain molecules oriented by the drawing and have a certain value of retardation. The retardation can be controlled by the selection of the retardation of the material before drawing, as well as by the degree of drawing, the drawing temperature, and the thickness of the stretched films. In a sheet with a certain thickness before drawing the absolute value of retardation tends to be large in the stretched film when the degree of drawing is large. Accordingly, stretched films with a desired retardation can be obtained by controlling the degree of the drawing. Films prepared by these methods and having a retardation in the range of 5–900 nm measured by polarizing microscope are used in the present invention. For example, optical retardation films used in the liquid crystal display panel using the TFT system must have a particularly high transparency. Thus a low retardation is desired in order to allow a wide angle of vision. Optical retardation films optically homogeneous and having a small retardation, e.g. in the range of 30–150 nm, are preferably used.

The retardation in the present invention is calculated by multiplying the difference between the refractive index of the film along the orientation direction and the refractive index along the direction vertical thereto (An) and the thickness of the film (d). It is therefore possible to control the retardation by controlling the retardation of the sheet before orientation, the degree of orientation, the orientation temperature, and the thickness of the oriented film.

<Color Filters>

Color filters used as a structural element of the liquid crystal display panel of the present invention consist of a transparent substrate made from the specific polymer with a colored layer formed thereon. Although there are no specific limitations to the thickness of the transparent substrate, a substrate with a thickness of 0.005–2 mm, preferably 0.01–0.5 mm, is preferably used.

Commonly known methods of forming colored layers, such as a dyeing method, a pigment dispersion method, printing, electrodeposition, or a photographic method, can be employed in the present invention. Given as specific examples of color filters are those prepared by the dyeing method described in Japanese Patent Laid-open (kokai) No. 292604/1986, by the pigment dispersion method described in Japanese Patent Laid-open (kokai) No. 343631/1993 or No. 3521/1994, the photographic method described in Japanese Patent Laid-open (kokai) No. 216307/1985, the printing method described in Japanese Patent Laid-open (kokai) No. 263123/1985, and by the electrodeposition method described in Japanese Patent Laid-open (kokai) No. 23803/1985.

Known dyes and pigments can be used as the coloring composition for producing color layers in the present invention. Examples include Suminol•Milling•Scarlet G (trademark, manufactured by Sumitomo Chemical Industries), Cibaclon. Scarlet G-P (Ciba Geigy), Cibaclon•Pront•Scarlet (Ciba Geigy), Suminol•Fastred G (Sumitomo Chemical Industries), Sumilite-Supra•Red 4BL (Sumitomo Chemical Industries), Aminil•Red E-2BL (Sumitomo Chemical Industries), Aminil•Red E-3BL (Sumitomo Chemical Industries), Azido•Scarlet 901 (Sumitomo Chemical Industries), Suminol•Milling•Scarlet FG (Sumitomo Chemical Industries), Suminol•Milling•Orange FG (Sumitomo Chemical Industries), Suminol•Fast•Orange PO (Sumitomo Chemical Industries), Maxilon•Red GRL (Ciba Geigy), Eryocine•Scarlet RE (Ciba Geigy), Micawan•Brilliant•Red 8BS (Mitsubishi Chemical), Azido•Light•Scarlet GL130 (Mitsubishi Chemical), Kayanol•Milling•Red RS125 (Nippon Kayaku), Suminol•Milling•Brilliant•Green 5G (Sumitomo Chemical Industries), Acid•Brilliant•Milling•Green G (Sumitomo Chemical Industries), Mication•Olive•Green 3GS (Ciba Geigy), Kayanol•Milling•Green 5GW (Nippon Kayaku), Thoridazole•Green P-GG (Hoext), Paper•Fast•Green 5G (Bayer), Sumilight•Supra•Tercois•Blue G (Sumitomo Chemical Industries), Cibaclon•Blue 3G-A (Ciba Geigy), Cibaclon•Blue 8G (Ciba Geigy), Procion•Tercois H-A (CIC), Kayathion•Tercois P-A (Nippon Kayaku), Kayathion•Tercois P-NGF (Nippon Kayaku), Sumicalon•Blue E-FBL (Sumitomo Chemical Industries), Sumicalon•Brilliant•Blue-S-BL (Sumitomo Chemical Industries), Suminol•Leveling•Skyblue• R•Extra•Conc (Sumitomo Chemical Industries), Orazole•Blue GN (Ciba Geigy), Maxion•Blue 3GS (Mitsubishi Chemical), Maxion•Blue 2GS (Mitsubishi Chemical), Kayanol•Milling. Blue GW (Nippon Kayaku), Kayacyl•Skyblue R (Nippon Kayaku), and the like.

Organic or inorganic pigments can be used as the pigment. As inorganic pigments, metal compounds such as metal oxides and metal complexes are used. Specific examples include oxides of iron, cobalt, aluminum, cadmium, lead, copper, titanium, magnesium, chromium, zinc, or antimony, and complex oxides of these metals.

Pigments insoluble in water or organic solvents can be used as the organic pigments. Specific examples include compounds classified as the pigments in the color index CI (published by The Society of Dyers and Colourists.), such as C.I. Pigment Yellow 24, C.I. Pigment Yellow 31, C.I. Pigment Yellow 53, C.I. Pigment Yellow 83, C.I. Pigment Orange 43, C.I. Pigment Red 105, C.I. Pigment Red 149, C.I. Pigment Red 176, C.I. Pigment Red 177, C.I. Pigment Violet 14, C.I. Pigment Violet 29, C.I. Pigment Blue 15, C.I. Pigment Blue 15:3, C.I. Pigment Blue 22, C.I. Pigment Blue 28, C.I. Pigment Green 15, C.I. Pigment Green 25, C.I. Pigment Green 36, C.I. Pigment Brown 28, C.I. Pigment Black 1, C.I. Pigment Black 7, and the like.

There are no limitations to the method of coating the composition to form a color layer on the transparent substrate in the present invention. Coatings of an arbitrary thickness may be produced by spin coating, roll coating, curtain coating, screen printing, offset printing, flexographic printing, or spray coating, and coatings are dyed at 70°–150° C. for about 10–30 minutes. There are no limitations to the pattern of the colored layer formed on the transparent substrate. Any patterns, such as square, circular dots, plovers, stripes, and polygons are possible. Black stripes may be formed for improving contrast between the patterns. In this instance, known black dyes or pigments may be used as the black layer for forming the stripes.

A physical treatment, such as the plasma treatment, or a chemical treatment, such as a treatment using various coating agents, e.g. coating agents of rubber, resins, acryls, or silicones, can be performed on the surface of transparent substrate in order to control the adhesion property before it is coated with the composition for forming the colored layer.

The color filter of the present invention may be provided with a known protective layer, transparent conductive layer, or liquid crystal orientation membrane over the colored layer after it has been formed on the transparent substrate.

<Light Guide Plate>

The light guide plate which is one of the structural elements of the liquid crystal display panel in the present invention can be prepared by molding the specific polymer using the aforementioned molding method. Although there are no specific limitations to the thickness of the light guide plate, a thickness in the range of 0.05–5 mm is preferable. For preparing the light guide plate in the present invention the specific polymer may be used alone, or a resin composition comprising the specific polymer and a light scattering agent, consisting of inorganic or organic fine particles, may be used for improving the front brightness. In this instance, the amount of the light scattering agent used is preferably 0.1–100 parts by weight for 100 parts by weight of the specific polymer in view of the balance between the light scattering characteristic and transparency. As inorganic fine particles which can be preferably used as the light scattering agent, glass beads, silica, talc, titanium oxide, barium sulfate, aluminum oxide, aluminum hydroxide, calcium carbonate, quartz, and the like can be given. Cross-linked polymer particles are preferably used as organic fine particles.

A light reflection layer consisting of white pigments and the like may be provided on one side of the light guide plate. There are no specific limitations to the method of forming the light reflection layer. Such a layer may be provided all over the surface by coating or printing, or, for the purpose of obtaining a specified brightness over the entire surface of the molded article irrespective of the location of the light source, the light reflection layer may be printed in a pattern of any optional shape, area, and distribution, wherein the shape may be dots, lines, comb-tooth, or the like. A further improvement of the front brightness is possible by blocking light outlet openings by covering the surfaces other than the irradiation surface with said white pigments or a mirror-like reflective layer. Furthermore, a known reflective sheet may be layered, if necessary.

<Light Diffusing Film, Converging Film>

The light diffusing film and the converging film, which are other structural elements of the liquid crystal display panel, can be obtained by forming a pattern of a shape possessing a light converging or scattering function over one of the surfaces of the film produced from the specific polymer by melt molding or solvent casting. The pattern possessing a light converging function can be prepared by embossing or by coating a radiation-curable resin, such as a UV curable resin. The pattern possessing a light scattering function can be prepared, in addition to the methods for preparing the patterns possessing a light converging function, by coating various coating materials containing beads. It is also possible to make the light diffusing film by molding a composition comprising the specific polymer and the aforementioned light scattering agents.

Given as examples of the radiation-curable resin compositions for forming patterns on the film are a composition comprising at least one compound containing at least one ethylene double bond, such as a (meth)acryloyl group, in the molecule and a photopolymerization initiator, a composition comprising at least one compound containing at least one ring-opening reactive group, such as an epoxy group, in the molecule and a photo-cationic reaction initiator, a composition comprising gelatin and a dichromate, a composition comprising a cyclic rubber and a bisazide photosensitizer, a composition comprising a novolak resin and a quinoneazide photosensitizer, and the like.

In order to control the adhesion properties of the film, a physical treatment, such as the plasma treatment, or a chemical treatment, such as a treatment using various coating agents, e.g. coating agents of rubber, resins, acryls, or silicones, can be performed on the surface of the transparent film before it is coated with the photosensitive agent.

It is desirable that the various films used for the liquid crystal display panel in the present invention have a small divergence in the retardation, preferably within ±20% at a wavelength of 633 nm. If the divergence is greater than ±20%, the liquid crystal substrate and the polarized film cannot be optically homogeneous. When used for a liquid crystal display panel, such a film may cause warping of images and cannot exhibit good performance.

The retardation in the present invention is measured by light with a wavelength of 633 nm using an Ellipsometer DVA-36LS (trademark, manufactured by Mizojiri Optical Co.).

The liquid crystal display panel of the present invention comprises at least one structural element selected from the above-described transparent conductive films, polarizers, optical retardation films, color filters, light guide plates, light diffusing films, and converging films, and prepared by combining these films and known liquid crystals, liquid crystal alignment layers, and the like.

There are no specific limitations to the order according to which these structural elements are combined. These elements may be laminated in the order which is conventionally applied in the manufacture of liquid crystal display panels. In a common structure, a the liquid crystal display panel comprises a transparent conductive film and a polarizer as essential structural elements.

Beside the structural elements made from the specific polymer as a base material, the liquid crystal display panel of the present invention may comprise structural elements made from known transparent materials other than the specific polymer, such as polyester resins (e.g. polyethylene terephthalate), acryl resins (e.g. polymethyl methacrylate), polycarbonate resins, triacetyl cellulose, polyvinyl alcohol, ABS resins, thermoplastic norbornene resins other than the specific polymer, and the like. However, in order to satisfy all the requirements of the liquid crystal display panel, such as distinctness of the display image, compactness and lightness, productivity, and durability, it is desirable that all structural elements be made from the specific polymer as the base material. It is preferable that at least the protective film of polarizers be made from the specific polymer. For preparing the liquid crystal display panel by laminating these structural elements, a glue or an adhesive may be used as needed. It is desirable that a highly transparent glue or adhesive be used for this purpose. Specific examples of such a glue or adhesive are natural rubber, synthetic rubber, vinyl acetate-vinyl chloride copolymer, polyvinyl ether, acrylic resins, and modified polyolefin resins, and mixtures of these resins and a curing agents such as isocyanate; dry laminate adhesive, such as a mixture of a polyurethane resin solution and a polyisocyanate resin solution; synthetic rubber adhesives; and epoxy resin adhesives.

It is also possible to use a solution of the specific polymer in an organic solution as the adhesive. In this instance, it is desirable that the specific polymer used for the film to be adhered and the specific polymer used as the adhesive have the same structure.

When the liquid crystal display panel of the present invention is combined with a light source, any light source commonly employed may be used, especially preferable light sources being those consisting of one or more lamps or a cold cathodic tube, arranged either on one or both sides of the light guide plate.

The liquid crystal display panel of the present invention can be used for cellular phone receivers, digital information terminals, pocket bells, liquid crystal display panels for vehicle mounted equipment (e.g navigators), liquid crystal monitors, light adjusting panels, OA equipment displays, AV equipment displays, and the like.

Other features of the invention will become apparent in the course of the following description of the exemplary embodiments which are given for illustration of the invention and are not intended to be limiting thereof. In the Examples hereinafter, "parts" means "parts by weight", unless otherwise indicated. The measurement of the following items in Examples below were carried out by the following method.

<Film Thickness (μm)>

The film thickness was measured using a dial-type thickness gauge.

<Transmittance (%)>

Transmittance was measured by a spectrophotometer while continuously changing wavelength over the range of from 400 to 900 nm. The minimum transmittance was taken as the transmittance of the film.

<Retardation (nm)>

Retardation was measured by an ellipsometer.

EXAMPLES

Synthetic Example 1

250 parts of 8-methyl-8-methoxycarbonyltetracyclo[4. 4. 0. $1^{2,5}$. $1^{7,10}$]-3-dodecene as the specific monomer, 18 parts of 1-hexene as a molecular weight modifier, and 750 parts of toluene were charged to a reaction vessel in which the air had been replaced with nitrogen, and heated at 60° C. To the mixture were added 0.62 part of a 1.5 mol/l solution of triethylaluminum in toluene, as a polymerization catalyst, and 3.7 parts of 0.05 mol/l $WCl_6$ solution, prepared by denaturing $WCl_6$ with tert-butanol and methanol and having a molar ratio of tertbutanol:methanol:W of 0.35:0.3:1. The resulting mixture was stirred for 3 hours at 80° C. to obtain a polymer solution.

The polymerization conversion rate was 97% and the inherent viscosity (ηinh) of the polymer was 0.65.

4000 parts of the polymer solution A obtained was placed in an autoclave. After the addition of 0.48 part of RuHCl(CO)[P($C_6H_5$)$_3$]$_3$, the polymer was hydrogenated under a hydrogen pressure of 100 kg/cm$^2$ at 165° C. for 3 hours while stirring. The resulting reaction mixture was allowed to cool and the hydrogen pressure was released, thus obtaining a solution of hydrogenated polymer. This hydrogenated polymer solution was solidified in a large quantity of methanol and dried to obtain a specific polymer. The degree of hydrogenation of this polymer was almost 100% and the glass transition temperature was 170° C. The polymer had a saturated water absorption of 0.4% at 23° C.

Synthetic Example 2

10 parts of a 15% solution of triethylaluminum in cyclohexane, as a polymerization catalyst, 5 parts of triethylamine, and 10 parts of 20% solution of titanium tetrachloride in cyclohexane were added to 6-methyl- 1,4,5,8-dimethano-1,4,4a,5,6,7,8,8a-octahydronaphthalene. The polymer obtained by the ring-opening polymerization in cyclohexane was hydrogenated using a nickel catalyst to obtain a hydrogenated polymer solution. This hydrogenated polymer solution was solidified in isopropyl alcohol and dried to obtain a polymer in the form of a powder. The number average molecular weight of the polymer was 45,000. The hydrogenation degree of was 99.9% and the glass transition temperature was 142° C. The polymer had a saturated water absorption of 0.01% at 23° C.

Reference Example 1

<Preparation of Transparent Conductive Film>

100 parts of the specific polymer obtained in Synthetic Example 1 was dissolved in 700 parts of toluene. This polymer solution was conditioned by the addition of 1 part of stearyl-β-(3,5-di-tert-butyl-4-hydroxyphenyl)propionate and 0.1 part of tris(2,4-di-tert-butylphenyl)phosphite. A film with a thickness of 80 μm was prepared from this polymer solution by solvent casting. The divergence of retardation of the film at 633 nm was ±5%. A transparent conductive film was prepared on this film using a target consisting of indium oxide and tin oxide (95:5 by weight) by spattering, to obtain a transparent conductive film with a transmittance of 85% at 400–800 nm.

Reference Example 2

<Preparation of Polarizer>

(a) Preparation of polarizing membrane

A polyvinyl alcohol film with a thickness of 50 μm was uniaxially stretched to a length of four times the original length in about 5 minutes, while the film was immersed in an aqueous bath at 40° C., which consisted of 5.0 g of iodine, 250 g of potassium iodide, 10 g of boric acid, and 1000 g of water. The film obtained was washed with alcohol and dried in air while being pulled, thus obtaining a polarized membrane.

(b) Preparation of Protective Film 100 parts of the specific polymer obtained in Synthetic Example 1 was dissolved in 700 parts of toluene. This polymer solution was conditioned by the addition of 1 part of stearyl-β-(3,5-di-tert-butyl-4-hydroxyphenyl)propionate and 0.1 part of tris(2,4-di-tert-butylphenyl)phosphite. A film with a thickness of 80 μm was prepared from this polymer solution by solvent casting. The divergence of retardation of the film at 633 nm was ±5%.

(c) Preparation of polarizer

A polarizer was prepared by laminating the polyvinyl alcohol polarizing membrane prepared in (a) on the protective film prepared in (b) using an adhesive, which was prepared by mixing 100 parts of an acrylic resin consisting of 90 wt % of n-butyl acrylate, 7 wt % of ethyl acrylate, and 3 wt % of acrylic acid and 2 parts of a 75% solution of trimethylolpropane (1 mol) adduct to tolylene diisocyanate (3 mols) in ethyl acetate.

Reference Example 3

<Preparation of Optical Retardation Film>

A film was prepared from a mixture of 100 parts of the specific polymer obtained in Synthetic Example 1, 1 part of stearyl-β-(3,5-di-tert-butyl-4-hydroxyphenyl)propionate, and 0.1 part of tris(2,4-di-tertbutylphenyl)phosphite by melt extrusion at a resin temperature of 280° C. The film was uniaxially stretched by a factor of 1.2 at 170° C. to obtain a optical retardation film. The film had an average thickness of 100 μm, an average retardation of 120 nm, and a divergence of retardation of ±8% at 633 nm.

Reference Example 4

<Preparation of Color Filter>

100 parts of the specific polymer obtained in Synthetic Example 1 was dissolved in 700 parts of toluene. This polymer solution was conditioned by the addition of 1 part of stearyl-β-(3,5-di-tert-butyl-4hydroxyphenyl)propionate and 0.1 part of tris(2,4-di-tert-butylphenyl)phosphite. A film with a thickness of 80 μm was prepared from this polymer solution by solvent casting. The divergence of retardation of the film at 633 nm was ±5%.

A color filter was prepared by forming 20 μm×20 μm red picture elements on this film by screen printing using a red ink.

Reference Example 5

<Preparation of Light Guide Plate>

A plate with a thickness of 1 mm was prepared from a mixture of 100 parts of the specific polymer obtained in Synthetic Example 1, 1 part of stearyl-β-(3,5-di-tert-butyl-4-hydroxyphenyl)-propionate, and 0.1 part of tris(2,4-di-tert-butylphenyl)phosphite by injection molding using a specularly polished die at a resin temperature of 320° C. and a die temperature of 130° C. A white pigment of titanium oxide was coated all over the surface of one side of the plate, thus producing a light guide plate.

Reference Example 6

<Preparation of Light Diffusing Film>

A film was prepared from a mixture of 100 parts of the specific polymer obtained in Synthetic Example 1, 1 part of stearyl-β-(3,5-di-tert-butyl-4-hydroxyphenyl)propionate, and 0.1 part of tris(2,4-di-tertbutylphenyl)phosphite by melt extrusion at a resin temperature of 280° C. This film was passed through an embossing roll and a process roll to obtain a light diffusing film with a thickness of 100 μm and an emboss depth of 30 μm.

Reference Example 7

<Preparation of Converging Film>

100 parts of the specific polymer obtained in Synthetic Example 1 was dissolved in 700 parts of toluene. This polymer solution was conditioned by the addition of 1 part of stearyl-β-(3,5-di-tert-butyl-4hydroxyphenyl)propionate and 0.1 part of tris(2,4-di-tert-butylphenyl)phosphite. A film with a thickness of 80 μm was prepared from this polymer solution by solvent casting. The divergence of retardation of the film at 633 nm was ±5%.

A UV-curable resin composition having the formulation shown below was coated on the surface of this film using an applicator bar with a clearance of 50 μm. Then, a stamper on which a pattern of fine irregularities was produced in advance was pressed onto the UV-curable resin. UV light of 1J/cm$^2$ was irradiated from the film side to cure the coated composition. After curing, the stamper was peeled off, thus obtaining a film with fine irregularities on the surface.

| (Formulation of the UV-curable resin composition) | |
|---|---|
| Epoxy acrylate (Epoxyester 3002A, trademark, Kyoeisha Chemical Co., Ltd.) | 60 g |
| Trimethylolpropane triacrylate Aronix M-309, trademark, Toagosei Chemical Industry Co., Ltd.) | 25 g |
| Acrylic acid (Osaka Organic Chemical Ind.) | 15 g |
| Photoinitiator (Irgacure 184, trademark, Ciba Geigy) | 4 g |

Example 1

Two sheets of the transparent conductive film prepared in Reference Example 1 were placed with the transparent conductive layers being positioned face-to-face, and caused to adhere via a spacer using an adhesive, a composition comprising a urethane adhesive (Takerac A-371, trademark, manufactured by Takeda Chemical Industries) and a curing agent (Takenate A-10, trademark, manufactured by Takeda Chemical Industries). A film with a thickness of 20 μm, prepared from a solution of 100 parts of the specific polymer in 700 parts of toluene by solvent casting, was used as the spacer by cutting out the center and leaving a 5 mm width at the periphery.

After adhesion, a liquid methoxybenzylidene-butyl aniline at 30° C. was injected using an injection needle so as to leave no air inside, thereby preparing a liquid crystal cell. The optical retardation film prepared in Reference Example 3 and the polarizer prepared in Reference Example 2 were successively laminated on one side of the liquid crystal cell. On another side the polarizer prepared in Reference Example 2, the converging film prepared in Reference Example 7, the scattering film prepared in Reference Example 6, and the light guide plate prepared in Reference Example 5 were successively laminated. The light guide plate was laminated with the white pigment coated side outside. A liquid crystal display panel was prepared by providing a light source of a cold cathode tube on one of the faces of the light guide plate.

Adhesion of films in this liquid crystal display panel was excellent, with no peeling being observed at all. A durability test was performed at 80° C. and 90% RH for 1000 hours. No abnormality was seen on the panel, demonstrating that it has excellent durability.

Comparative Example 1

A transparent conductive film, a polarizer, a optical retardation film, a color filter, a light guide plate, a light diffusing film, and a converging film were prepared in the same manner as in Reference Examples 1–7, provided that the polymer obtained in Synthetic Example 2 was used instead of the specific polymer obtained in Synthetic Example 1, and further that the amounts of antioxidants added for 100 parts of the polymer were 0.1 part of stearyl-β-(3,5-di-tert-butyl-4-hydroxyphenyl)propionate and 0.01 part of tris(2,4-di-tert-butylphenyl)phosphite. (When the same amounts of these antioxidants as in Example 1, i.e. 1 part of stearyl-β-(3,5-di-tert-butyl-4-hydroxyphenyl)-propionate and 0.1 part of tris(2,4-di-tert-butylphenyl)-phosphite were added for 100 parts of the polymer, the resulting film was cloudy and could not be used.)

A liquid crystal display panel was prepared using these films in the same manner as in Example 1. The display panel obtained was partly colored and had some peeled areas.

A durability test was performed at 80° C. and 90% RH for 1000 hours. Clouds and peeling were observed all over the display panel.

Example 2

A pattern of a transparent conductive layer consisting of indium oxide and tin oxide (weight ratio, 95:5) was formed on the colored layer of the color filter prepared in Reference Example 4. A liquid crystal display panel was prepared in the same manner as in Example 1, except for using this color filter instead of the transparent conductive film prepared in Reference Example 1.

Adhesion of the color filter was excellent, with no voids in the colored elements and no peeling being observed at all. A durability test was performed at 80° C. and 90% RH. No abnormality was seen on the panel during the 1000 hour durability tests, demonstrating that it has excellent durability.

Comparative Example 2

A color filter was prepared in the same manner as in Reference Example 4, except for adding 0.1 part of stearyl-β-(3,5-di-tert-butyl-4-hydroxyphenyl)propionate and 0.01 part of tris(2,4-di-tert-butylphenyl)phosphite for 100 parts of the polymer. A transparent conductive layer was formed on this color filter in the same manner as in Example 2. A liquid crystal display panel with the same structure as that in Example 1 was prepared using this color filter and other structural elements which were produced from the polymer of Synthetic Example 2. A part of the colored elements of the color filter peeled off. A durability test was performed at 80° C. and 90% RH for 1000 hours. The liquid crystal display panel were cloudy all over that surface and peeling was conspicuous.

Example 3

A film with a thickness of 80 μm was prepared from a mixture of 100 parts of the specific polymer obtained in Synthetic Example 1, 1 part of stearyl-β-(3,5-di-tert-butyl-4-hydroxyphenyl)propionate and 0.1 part of tris(2,4-di-tert-butylphenyl)phosphite by melt extrusion at a resin temperature of 280° C.

An anchoring agent solution comprising an ionic polymer complex (Toyobine 210K, trademark, manufactured by Toso Co.) and a 50:50 water-alcohol mixture as a solvent was applied to the film and dried at 90° C. for 5 minutes, thereby forming an aqueous anchorcoat layer. An adhesive layer, consisting of a urethane adhesive (Takerac A-371, trademark, manufactured by Takeda Chemical Industries) and a curing agent (Takenate A-10, trademark, manufactured by Takeda Chemical Industries), was formed on this aqueous anchorcoat layer.

A bicolor dye polarized membrane of ethylene-vinyl alcohol copolymer was laid on this adhesive layer and laminated while pressing at a pressure of 3 kg/cm² and heating at 80° C.

A transparent conductive layer was formed on this polarized membrane by spattering using a target consisting of indium oxide and tin oxide (95:5 by weight).

A liquid crystal display panel having a laminated structure consisting of a transparent electrode, a polarizing membrane, an adhesive layer, an aqueous anchorcoat layer, and a substrate layer was prepared in this manner.

Adhesion of the substrate layer and the polarizing membrane was excellent, with no peeling being observed at all. A durability test was performed at 80° C. and 90% RH. No abnormality was seen on the panel in 1000 hours during the test, demonstrating that it has excellent durability.

Comparative Example 3

A film with a thickness of 80 μm was prepared in the same manner as in Example 3, except using 100 parts of the polymer prepared in Synthetic Example 2 instead of the specific polymer prepared in Synthetic Example 1 and adding 0.1 part of stearyl-β-(3,5-di-tert-butyl-4hydroxyphenyl)propionate and 0.01 part of tris(2,4-di-tert-butylphenyl)phosphite. A liquid crystal display panel having a laminated structure consisting of a transparent electrode, a polarizing membrane, a adhesive layer, an aqueous anchorcoat layer, and a substrate layer was then prepared using this film in the same manner as in Example 3.

The conditions of adhesion between the substrate layer and the polarizing membrane was examined, . confirming a part was peeled off. A durability test was performed at 80° C. and 90% RH for 1000 hours. The liquid crystal display panel were cloudy all over the surface and peeling was conspicuous.

The liquid crystal display panel of the present invention, wherein a thermoplastic norbornene resin containing a specific polar group is used as the structural elements, is light and have excellent transparency. Due to inclusion of the polar group in its structure, its heat resistance is increased and the adhesion with other films is greatly improved. Since compatibility with an antioxidant, of which the addition is essential for the norbornene resin, is remarkably promoted, durability of the resin can be also improved.

The liquid crystal display panel prepared from the structural elements made from this resin as a base material is light and convenient to use, excellent in the distinctness of image and productivity, and exhibits no deterioration in image quality during the use in severe, high temperature and high humidity conditions for a long period of time.

Obviously, numerous modifications and variations of the present invention are possible in light of the above teachings. It is therefore to be understood that within the scope of the appended claims, the invention may be practiced otherwise than as specifically described herein.

What is claimed is:

1. A liquid crystal display which comprises at least one structural element selected from the group consisting of a transparent conductive film, a polarizer, an optical retardation film, a color filter, a light guide plate, a light diffusing film, and a converging film, wherein said at least one structural element comprises a layer comprising (A), (B) or (C), where:

(A) is a hydrogenated product of a polymer obtained by the ring-opening polymerization of a monomer (I'), represented by the following formula

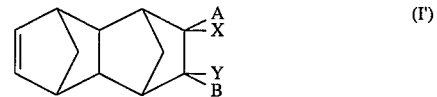

wherein A and B may be the same or different and each represents a hydrogen atom or a hydrocarbon group having 1 to 10 carbon atoms; X and Y may be the same or different and each represents a hydrogen atom or a monovalent organic group having 1 to 10 carbon atoms, provided that either X or Y is a group having a polar group other than a hydrogen atom or a hydrocarbon group, (B) is a hydrogenated product of polymer obtained by the ring-opening copolymerization of a monomer represented by formula (I') and a monomer other than a monomer represented by formula (I') but copolymerizable therewith, and (C) is a mixture of two or more polymers selected from polymers according to (A) and (B) above wherein said (A), (B) and (C) polymers have a saturated water absorption of 0.1–1% by weight based on the total weight of polymer at 23° C.

2. The liquid crystal display as claimed in claim 1, wherein said at least one structural element comprises a layer comprising (A).

3. The liquid crystal display as claimed in claim 1, wherein said at least one structural element comprises a layer comprising (B).

4. The liquid crystal display as claimed in claim 1, wherein said at least one structural element comprises a layer comprising (C).

5. The liquid crystal display has claimed in claim 1, wherein said polar group is represented by the formula:

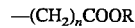

where n equals 0–5 and R is a hydrocarbon group having from 1–12 carbon atoms.

6. The liquid crystal display panel as claimed in claim 5, wherein n equals 0 and R is an alkyl group.

7. The liquid crystal display panel as claimed in claim 1, wherein said monomer represented by formula (I') is 8-methyl- 8-methoxycarbonyltetracyclo-3-dodecene.

8. The liquid crystal display as claimed in claim 1, wherein the monomer represented by formula (I') is selected from the group consisting of:
8-methoxycarbonyltetracyclo-3-dodecene,
8-ethoxycarbonyltetracyclo-3-dodecene,
8-carboxy-n-propyltetracyclo-3-dodecene,
8-carboxy-iso-propyltetracyclo-3-dodecene,
8-carboxy-n-butyltetracyclo-3-dodecene,
8-methyl-8-methoxycarbonyltetracyclo-3-dodecene,
8-methyl-8-ethoxycarbonyltetracyclo-3-dodecene,
8-methyl-8-carboxy-n-propyltetracyclo-3-dodecene,
8-methyl-8-carboxy-iso-propyltetracyclo-3-dodecene, and
8-methyl-8-carboxy-n-butyltetracyclo-3-dodecene.

9. The liquid crystal panel as claimed in claim 1, wherein in (B) and (C) the monomer copolymerizable with said monomer represented by formula (I') is a cycloolefin.

10. The liquid crystal display has claimed in claim 2, wherein said polar group is represented by the formula:

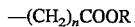

where n equals 0–5 and R is a hydrocarbon group having from 1–12 carbon atoms.

11. The liquid crystal display panel as claimed in claim 10, wherein n equals 0 and R is an alkyl group.

12. The liquid crystal display panel as claimed in claim 2, wherein said monomer represented by formula (I') is 8-methyl- 8-methoxycarbonyltetracyclo-3-dodecene.

13. The liquid crystal display as claimed in claim 2, wherein the monomer represented by formula (I') is selected from the group consisting of:
8-methoxycarbonyltetracyclo-3-dodecene,
8-ethoxycarbonyltetracyclo-3-dodecene,
8-carboxy-n-propyltetracyclo-3-dodecene,
8-carboxy-iso-propyltetracyclo-3-dodecene,
8-carboxy-n-butyltetracyclo-3-dodecene,
8-methyl-8-methoxycarbonyltetracyclo-3-dodecene,
8-methyl-8-ethoxycarbonyltetracyclo-3-dodecene,
8-methyl-8-carboxy-n-propyltetracyclo-3-dodecene,
8-methyl-8-carboxy-iso-propyltetracyclo-3-dodecene, and
8-methyl-8-carboxy-n-butyltetracyclo-3-dodecene.

14. The liquid crystal panel as claimed in claim 2, wherein in (B) and (C) the monomer copolymerizable with said monomer represented by formula (I') is a cycloolefin.

15. The liquid crystal display has claimed in claim 3, wherein said polar group is represented by the formula:

—(CH$_2$)$_n$COOR where n equals 0–5 and R is a hydrocarbon group having from 1–12 carbon atoms.

16. The liquid crystal display panel as claimed in claim 15, wherein n equals 0 and R is an alkyl group.

17. The liquid crystal display panel as claimed in claim 3, wherein said monomer represented by formula (I') is 8-methyl- 8-methoxycarbonyltetracyclo-3-dodecene.

18. The liquid crystal display as claimed in claim 3, wherein the monomer represented by formula (I') is selected from the group consisting of:
8-methoxycarbonyltetracyclo-3-dodecene,
8-ethoxycarbonyltetracyclo-3-dodecene,
8-carboxy-n-propyltetracyclo-3-dodecene,
8-carboxy-iso-propyltetracyclo-3-dodecene,
8-carboxy-n-butyltetracyclo-3-dodecene,
8-methyl-8-methoxycarbonyltetracyclo-3-dodecene,
8-methyl-8-ethoxycarbonyltetracyclo-3-dodecene,
8-methyl-8-carboxy-n-propyltetracyclo-3-dodecene,
8-methyl-8-carboxy-iso-propyltetracyclo-3-dodecene, and
8-methyl-8-carboxy-n-butyltetracyclo-3-dodecene.

19. The liquid crystal panel as claimed in claim 3, wherein in (B) and (C) the monomer copolymerizable with said monomer represented by formula (I') is a cycloolefin.

* * * * *